(12) United States Patent
Han

(10) Patent No.: US 12,380,054 B2
(45) Date of Patent: Aug. 5, 2025

(54) ELECTRONIC DEVICE AND METHOD FOR CONTROLLING POWER SUPPLY OF ELECTRONIC DEVICE

(71) Applicant: Samsung Electronics Co., Ltd., Suwon-si (KR)

(72) Inventor: Junghun Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/346,540

(22) Filed: Jul. 3, 2023

(65) Prior Publication Data

US 2023/0350839 A1 Nov. 2, 2023

Related U.S. Application Data

(63) Continuation of application No. PCT/KR2022/002071, filed on Feb. 11, 2022.

(30) Foreign Application Priority Data

Mar. 2, 2021 (KR) .................. 10-2021-0027636

(51) Int. Cl.
*G06F 13/42* (2006.01)
*G06F 1/26* (2006.01)
(Continued)

(52) U.S. Cl.
CPC ............ *G06F 13/4282* (2013.01); *G06F 1/26* (2013.01); *G06F 13/382* (2013.01);
(Continued)

(58) Field of Classification Search
CPC ...... G06F 13/4282; G06F 1/26; G06F 13/382; G06F 2213/0042; H02J 7/00045; H02J 2207/30; H02J 7/0029
See application file for complete search history.

(56) References Cited

U.S. PATENT DOCUMENTS 6,822,424 B2 11/2004 Odaohhara
9,104,390 B2 8/2015 Tsutsui
(Continued)

FOREIGN PATENT DOCUMENTS

CN 111198743 5/2020
JP 2013142908 A 7/2013
(Continued)

OTHER PUBLICATIONS

International Search Report for PCT/KR2022/002071 mailed May 19, 2022, 4 pages.
(Continued)

*Primary Examiner* — Henry Tsai
*Assistant Examiner* — Harry Z Wang
(74) *Attorney, Agent, or Firm* — Nixon & Vanderhye, P.C.

(57) ABSTRACT

An electronic device according to various embodiments comprises: a universal serial bus (USB) interface for configuration channel (CC) communication with an external device; a power management IC (PMIC) for power control of the electronic device; and a processor operatively connected to the USB interface and the PMIC. The processor is configured to: control to transmit a first command, requesting unique identification information, to the external device via the USB interface based on the external device being connected via the USB interface; recognize the external device as a power supply device, for supplying power to the electronic device, on the basis of the unique identification information received from the external device; and control to transmit a second command, instructing rebooting of the external device, via the USB interface based on the electronic device including a battery and being powered off, and not transmit the second command to the external device
(Continued)

based on the electronic device not including a battery and being powered off.

17 Claims, 8 Drawing Sheets

(51) Int. Cl.
*G06F 13/38* (2006.01)
*H02J 7/00* (2006.01)

(52) U.S. Cl.
CPC .. *H02J 7/00045* (2020.01); *G06F 2213/0042* (2013.01); *H02J 7/0029* (2013.01); *H02J 2207/30* (2020.01)

(56) References Cited

U.S. PATENT DOCUMENTS

| | | | |
|---|---|---|---|
| 10,020,665 | B2 | 7/2018 | Uan-zo-li et al. |
| 10,528,264 | B2 | 1/2020 | Kim |
| 10,630,102 | B2 | 4/2020 | Sa |
| 11,068,427 | B2 | 7/2021 | Kim et al. |
| 11,113,224 | B2 | 9/2021 | Li |
| 2007/0176731 | A1 | 8/2007 | Asai |
| 2008/0258686 | A1* | 10/2008 | Li .................... H02J 7/00 320/134 |
| 2013/0214935 | A1 | 8/2013 | Kim et al. |
| 2015/0035475 | A1* | 2/2015 | Li .................... H02J 7/00309 320/107 |
| 2015/0067196 | A1* | 3/2015 | Little .................... G06F 9/44584 710/14 |
| 2015/0180543 | A1* | 6/2015 | Verma .................... H04B 5/72 455/41.1 |
| 2016/0046199 | A1* | 2/2016 | Butler .................... H02J 7/0048 320/106 |
| 2018/0254648 | A1* | 9/2018 | Harju .................... H02J 7/00 |
| 2018/0335819 | A1* | 11/2018 | Waters .................... H02M 3/137 |
| 2019/0065422 | A1 | 2/2019 | Sporck et al. |
| 2019/0236037 | A1* | 8/2019 | Sugumar .................... G06F 1/266 |
| 2019/0312448 | A1 | 10/2019 | Lim et al. |
| 2021/0397235 | A1* | 12/2021 | Schneider .................... H02J 7/0044 |

FOREIGN PATENT DOCUMENTS

| | | |
|---|---|---|
| KR | 20090027506 A | 3/2009 |
| KR | 101626976 B1 | 6/2016 |
| KR | 20180020479 A | 2/2018 |
| KR | 101928040 B1 | 12/2018 |
| KR | 20190021776 A | 3/2019 |
| KR | 20200001747 U | 8/2020 |
| KR | 102155041 B1 | 9/2020 |

OTHER PUBLICATIONS

Written Opinion of the ISA for PCT/KR2022/002071 mailed May 19, 2022, 4 pages.
Extended European Search Report dated Jul. 3, 2024 issued in European Patent Application No. 22763486.2.

* cited by examiner

ELECTRONIC DEVICE AND METHOD FOR CONTROLLING POWER SUPPLY OF ELECTRONIC DEVICE

CROSS-REFERENCE TO RELATED APPLICATIONS

This application is a continuation of International Application No. PCT/KR2022/002071 designating the United States, filed on Feb. 11, 2022, in the Korean Intellectual Property Receiving Office and claiming priority to Korean Patent Application No. 10-2021-0027636, filed on Mar. 2, 2021, in the Korean Intellectual Property Office, the disclosures of each of which are incorporated by reference herein in their entireties.

BACKGROUND

Field

The disclosure relates to an electronic device, for example, an electronic device and a method of controlling power supply of the electronic device.

Description of Related Art

Power of a battery of a vehicle may be supplied by various electronic devices. For example, a navigation or a driving record measurement device may receive power from a battery of a vehicle in the state in which the device does not have an internal power source. The electronic device may support a standardized interface such as a universal serial bus (USB) for the connection with an external power supply device and may internally include an additional interface as well as the USB for data communication with some external devices.

The electronic device may receive power through a USB connector included in a power supply device connected to a power source of the battery of the vehicle. The external power supply device may supply power required for driving the electronic device through the USB connector. Further, the power supply device connected to the electronic device using a USB type-C standard may transmit/receive a control signal to the electronic device through a configuration channel (CC) defined in the USB type-C standard. In addition, the electronic device connected to the power supply device may transmit/receive a control signal to the external power supply device through a configuration channel (CC) defined in the USB type-C standard.

The matters which have been described as the technology corresponding to the background of the disclosure are only for assisting with an understanding of the background of the disclosure, and should not be considered as the prior art already known to those skilled in the art.

In the prior art, when power is applied to an electronic device having no internal power source (for example, a battery) through an external device, the electronic device may be rebooted without being turned off. When the electronic device is rebooted, power consumption may be continuously generated in the electronic device and thus power of a power source (for example, a battery) of the external device or power of an external power source (for example, a wall outlet) connected to the external device may be consumed. Further, a user may have inconvenience of putting out a cable of the external device connected to the electronic device in order to turn off the electronic device, and accordingly there may be a limit on designing of the external device.

SUMMARY

According to various embodiments of the disclosure, when an external device to which always-on power is applied is connected to an electronic device, a problem that the electronic device is rebooted may be addressed by turning off the electronic device.

An electronic device according to various example embodiments includes: a USB interface configured to perform configuration channel (CC) communication with an external device, a power management IC (PMIC) configured to control power of the electronic device, and a processor operatively connected to the USB interface and the PMIC, wherein the processor is configured to: based on the external device being connected through the USB interface, perform control to transmit a first command making a request for unique identification information to the external device through the USB interface, recognize the external device as a power supply device supplying power to the electronic device based on the unique identification information received from the external device, based on the electronic device having a battery and the electronic device being turned off, transmit a second command indicating rebooting of the external device through the USB interface, and based on the electronic device not having a battery and the electronic device being turned off, not transmitting the second command to the external device.

A method of controlling power by an electronic device according to various example embodiments includes: detecting a connection of an external device, making a request for unique identification information to the external device based on the electronic device having a battery and the electronic device being turned off, transmitting a second command to the external device, and based on the electronic device not having a battery and the electronic device being turned off, not transmitting the second command to the external device.

According to various example embodiments, when a power source is connected to an electronic device having no internal power source through an external device, power consumption can be prevented and/or reduced by normally turning off the electronic device. Accordingly, it is possible to prevent and/or reduce power consumption of a power source (for example, a battery) of the external device or an external power source connected to the external device.

According to various example embodiments, it is possible to turn off the electronic device without putting output a cable of the external device connected to the electronic device. Therefore, the external device can be freely designed and inconvenience of manually putting out the cable can be resolved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
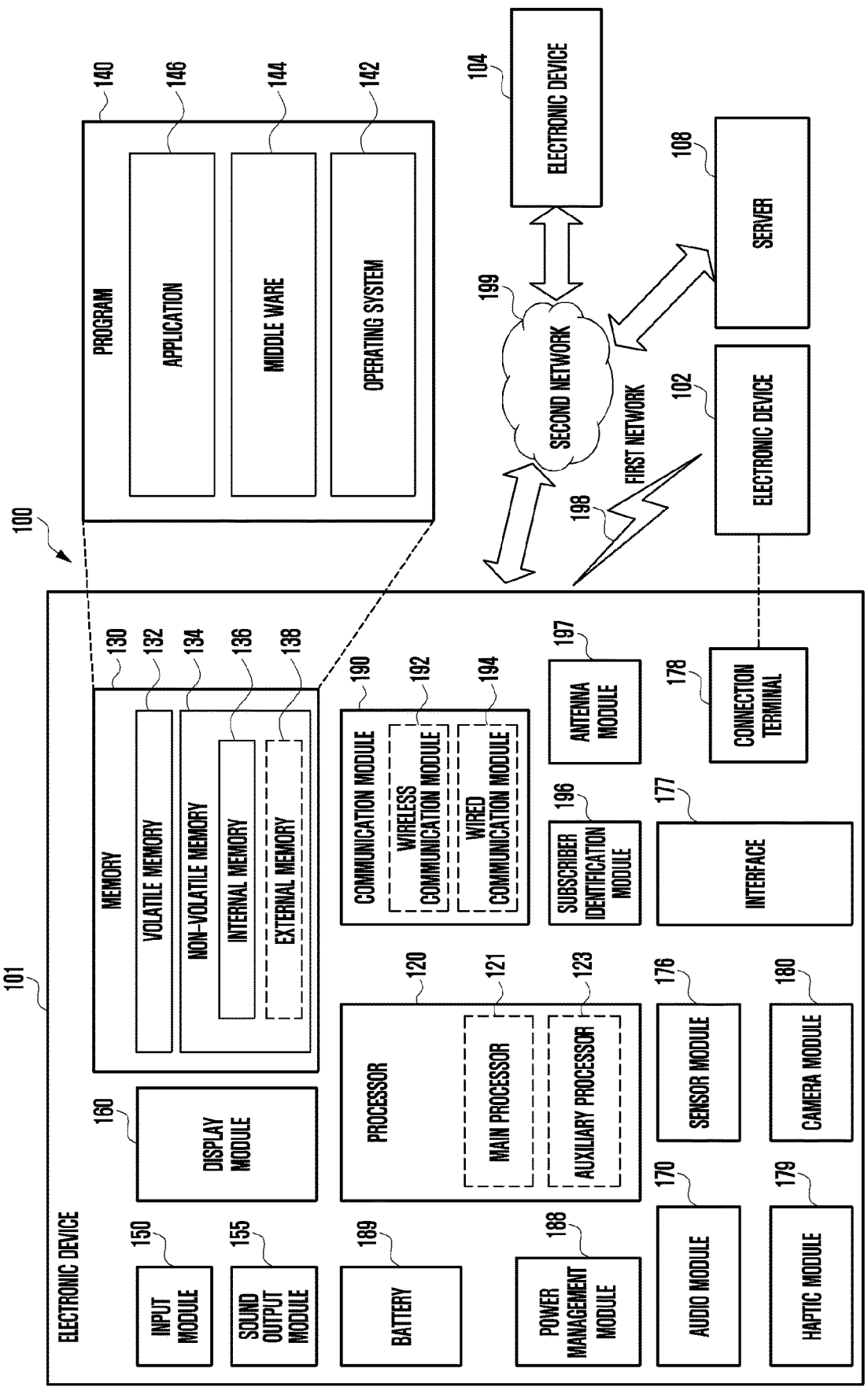
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
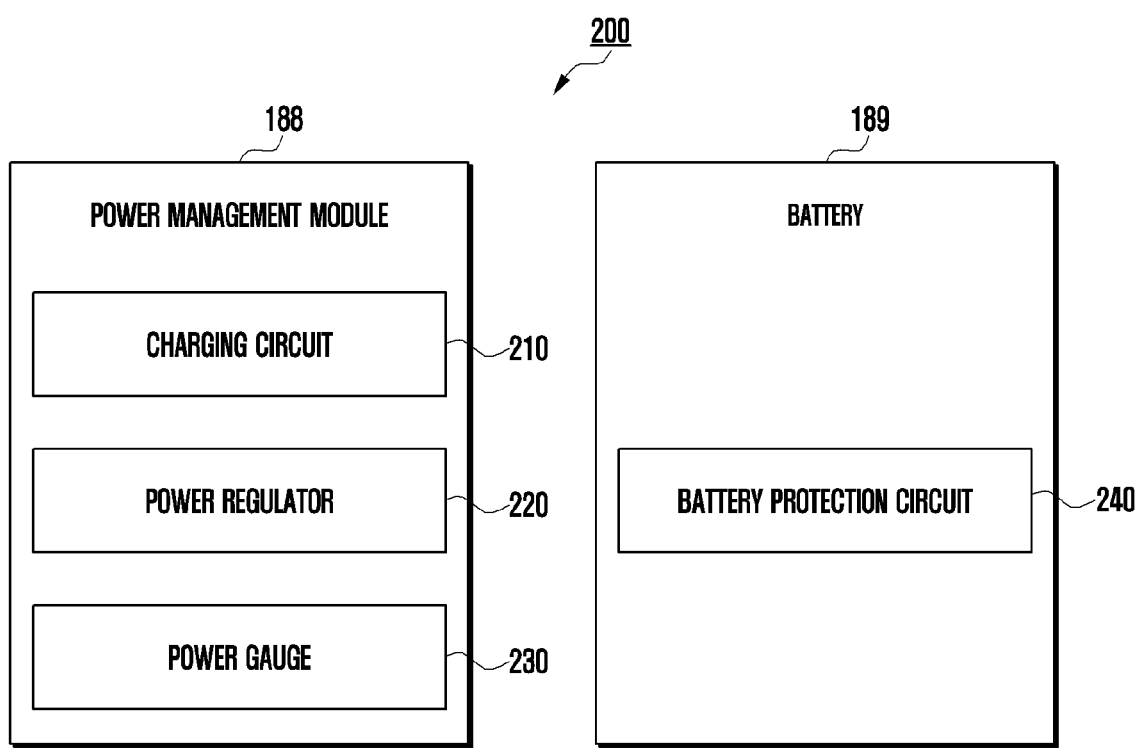
FIG. 2 is a block diagram illustrating an example configuration of a power management module and a battery according to various embodiments.

FIG. 2 is a block diagram 200 illustrating an example configuration of a power management module 188 and a battery 189 according to various embodiments. Referring to FIG. 2, the power management module 188 may include a charging circuit 210, a power regulator 220, or a power gauge 230. The charging circuit 210 may charge the battery 189 with power supplied from an external power source of the electronic device 101. According to an embodiment, the charging circuit 210 may select a charting scheme (For example, normal charging or fast charging) on the basis of at least some of a type of an external power source (for example, a power adaptor, a USB, or wireless charging), a size of power which can be supplied from the external power source (for example, about 20 Watts or higher), or attributes of the battery 189, and charge the battery 189 through the selected charging scheme. The external power source may be connected to the electronic device 101 wiredly through, for example, the connectivity terminal 178 or wirelessly through the antenna module 197.

The power regulator 220 may include various circuitry and generate a plurality of powers having different voltage or current levels by controlling a voltage level or a current level of power supplied from, for example, the external power source or the battery 189. The power regulator 220 may control power of the external power source or the battery 189 to be a voltage or current level suitable for some or each of the elements included in the electronic device 101. According to an embodiment, the power regulator 220 may be implemented in the form of a low drop out (LDO) regulator or a switching regulator. The power gauge 230 may include various circuitry and measure usage state information of the battery 189 (for example, a capacity, the number of charging and discharging, a voltage, or a temperature of the battery 189).

The power management module 188 may determine charging state information (for example, lifespan, overvoltage, undervoltage, overcurrent, overcharging, overdischarging, overheat, short circuit, or swelling) related to charging of the battery 189 on the basis of at least some of the measured usage state information through, for example, the charging circuit 210, the voltage regulator 220, or the power gauge 230. The power management module 188 may determine whether the battery 189 is normal or abnormal on the basis of at least some of the determined charging state information. When it is determined that the state of the battery 189 is abnormal, the power management module 188 may control charging of the battery 189 (for example, reduce the charging current or voltage or stop charging). According to an embodiment, at least some of the functions of the power management module 188 may be performed by an external control device (for example, the processor 120).

The battery 189 may include a battery protection circuit (protection circuit module (PCM)) 240 according to an embodiment. The battery protection circuit 240 may perform one or more of various functions (for example, a pre-blocking function) to prevent and/or reduce performance deterioration or damage of the battery 189. The battery protection circuit 240 may be additionally or alternatively configured as at least part of a Battery Management System (BMS) for performing cell balancing, battery capability measurement, measurement of the number of charges/discharges, temperature measurement, or voltage measurement.

According to an embodiment, at least some of the usage state information or the charging state information may be measured using a corresponding sensor (for example, a temperature sensor) in the sensor module 176, the power gauge 230, or the power management module 188. According to an embodiment, the corresponding sensor (for example, the temperature sensor) in the sensor module 176 may be included as a part of the battery protection circuit 140 or may be disposed near the battery 189 as a separate device.

Figure 3:
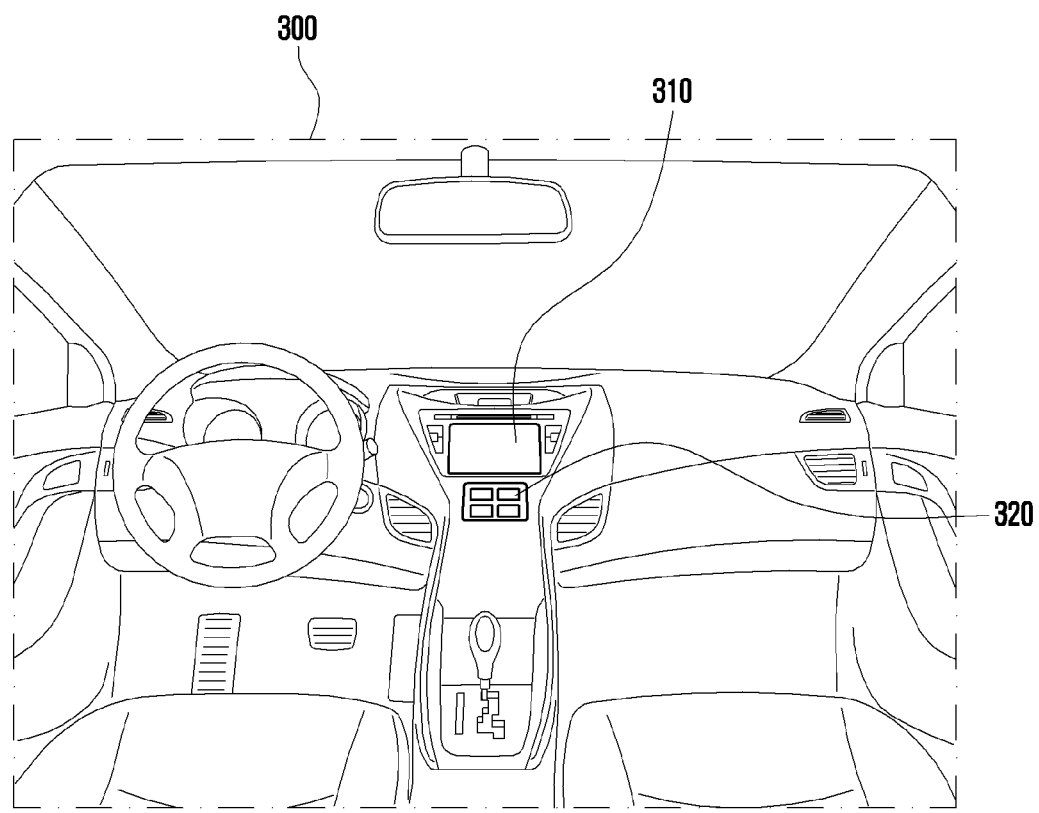
FIG. 3 is a diagram illustrating an example in which a power supply device and an electronic device are used within a vehicle according to various embodiments.

FIG. 3 is a diagram illustrating an example in which a power supply device 320 and an electronic device are used within a vehicle according to various embodiments.

According to various embodiments, a battery of a vehicle 300 may supply power to an electronic device 310 (for example, a navigation or a vehicle driving record measurement device) having no internal power source. Further, the power supply device 320 may receive battery power of the vehicle 300 and supply the received battery power of the vehicle 300 to another external electronic device (for example, a tablet) (not shown) through a connector (for example, a USB type-C connector) of the power supply device 320. For example, the battery of the vehicle 300 may supply power to the navigation installed in the vehicle. Further, the external electronic device (not shown) may have a removable internal battery and may be connected to the power supply device 320. When the external electronic device (not shown) is connected to the power supply device 320, the external electronic device (not shown) may receive power to operate even when the battery of the external electronic device (not shown) is removed.

According to various embodiments, the electronic device 310 having no internal power source (for example, a navigation having no internal power source, a vehicle driving record measurement deice having no internal power source, a tablet from which an internal battery is removed, or the like) may receive power from the battery of the vehicle 300 to operate. When the engine of the vehicle 300 is turned off, the navigation should be first turned off in case the engine is turned off. When power of the electronic device 310 having no internal power source is turned off, the electronic device 310 having no internal power source may be continuously rebooted due to a hard reset signal described below.

According to various embodiments, when power of the electronic device 310 is turned off, the hard reset signal may be transmitted to the power supply device 320 through a configuration channel (CC) during the power off. A communication process through the configuration channel is described in detail with reference to FIG. 5. The hard reset signal may make the power supply device 320 turned on after being turned off. When the power supply device 320 is turned off and then turned on, a power on source may be triggered in the electronic device 310 connected to the power supply device (for example, the battery 189 of FIG. 1). A PMIC (for example, the power management module 188 of FIG. 2) of the electronic device 310 may detect the power on source and turn on the electronic device 310. Even through the electronic device 310 is turned off through such a process, a phenomenon of turning on the electronic device 310 may repeatedly occur.

In this case, the electronic device 310 is continuously in the on state without being turned off, and thus power consumption of the connected battery may be generated. Accordingly, power of the power source (for example, the battery) of the external device or power of the external power source connected to the external device may be consumed. For example, the battery of the vehicle 300 may be discharged. Further, when the electronic device 310 is connected to a wall outlet, power consumption may be continuously generated. Since the user should remove a cable to turn off the electronic device 310 connected to the power supply device 320, usability may deteriorate. A configuration of the electronic device 310 for performing power off is described in greater detail below with reference to FIGS. 4A to 5, and a method of controlling power supply of the electronic device 310 is described in greater detail below with reference to FIGS. 6 to 7.

Figure 4A:
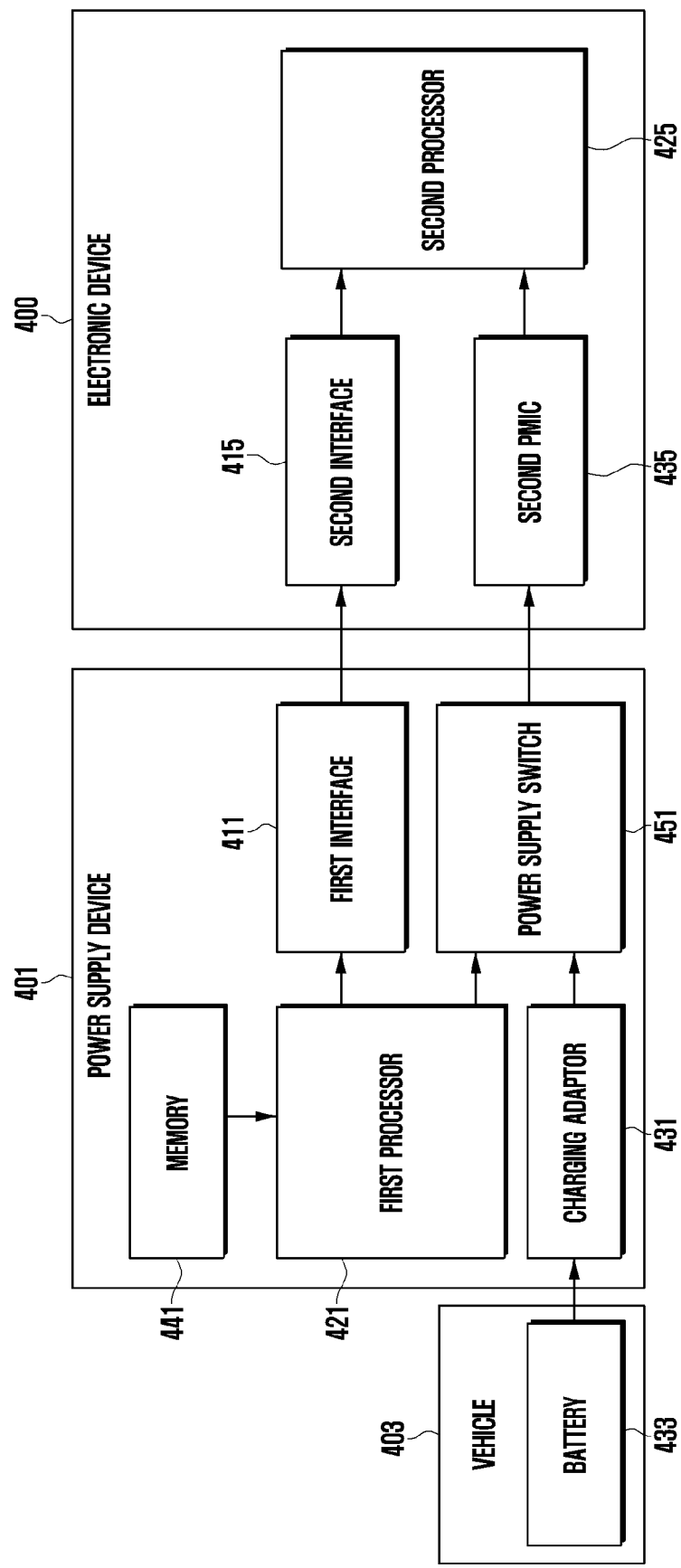
FIG. 4A is a block diagram illustrating an example configuration of the power supply device and the electronic device and connection states according to various embodiments.

FIG. 4A is a block diagram illustrating an example configuration and a connection state of each of a power supply device and an electronic device according to various embodiments.

According to various embodiments, an electronic device 400 may include a second interface 415 (for example, USB type-C) for performing configuration channel (CC) communication with a power supply device 401 or receiving power, a second power management IC (PMIC) 435 serving to control power of the electronic device 400, and a second processor (e.g., including processing circuitry) 425 operatively connected to the second PMIC 435. When the power supply device 401 is connected through the second interface 415 (for example, a USB interface), the second processor 425 may perform control to transmit a first command making a request for unique identification information to the power supply device 401 through the second interface 415. The first command may include a discovery identity command making a request for unique identification information of an external device. The discovery identity command may be transferred to the external device from the interface through configuration channel (CC) communication. The second processor 425 may recognize a type of the power supply device 401 on the basis of unique identification information included in a device ID received from the power supply device 401.

According to various embodiments, when the electronic device 400 includes a battery, the second processor 425 may transmit a second command indicting a change of a power state (rebooting, reset, or power supply reconfiguration) of the power supply device 401 through the second interface 415 when the electronic device 400 is turned off. When the electronic device 400 includes no battery, the second processor 425 may perform control to not transmit the second command to the power supply device 401 when the electronic device 400 is turned off. The second command may include a hard reset signal for turning off the power supply device 401 and then turning on the power supply device 401 again when the electronic device 400 is turned off. The hard reset signal may be transferred to the power supply device 401 from the second interface 415 through configuration channel (CC) communication.

According to various embodiments, a battery 433 of a vehicle 403 or an outlet may supply power to the electronic device 400 through the power supply device 401. The power supply device 401 may be connected to the electronic device 400 to transmit/receive data. The power supply device 401 may include an accessory device which can be connected to the vehicle battery. The electronic device 400 may not have an internal battery or may include a removable battery.

According to various embodiments, the power supply device 401 may include a first interface 411, a first processor (e.g., including processing circuitry) 421, a charging adaptor (e.g., including various circuitry) 431, and a power supply switch 451. The power supply device 401 may transmit and receive data (for example, a device ID, a vender ID, or a product ID) to and from the electronic device 400 through an inter-device interface (for example, the first interface 411 and the second interface 415). Further, after a voltage is transformed through the charging adaptor 431, power may be transmitted to the electronic device 400 through the power supply switch 451. The power supply device 401 may include a device ID. The device ID may be included in a memory 441 or the processor 421 according to circumstances. According to various embodiments, the device ID may be included in the first interface 411. For example, the first interface 411 may include information on a circuit (for example, resistance) related to the device ID.

According to various embodiments, the electronic device 400 capable of transmitting/receiving data through the electrical connection with the power supply device 401 may include the second interface 415, the second processor 425, and the PMIC 435. Further, some of the illustrated elements may be omitted or replaced. The electronic device 400 may further include at least some of the elements and/or functions of the electronic device 101 of FIG. 1. At least some of the elements of the electronic device 400 which are (or are not) illustrated may be operatively, functionally, and/or electrically connected to each other.

According to various embodiments, the second processor 425 is an element for performing calculations or data processing for the control and/or communication of respective elements of the electronic device 400 and may be configured as one or more processors. The second processor 425 may include at least some of the elements and/or functions of the processor 120 of FIG. 1.

According to various embodiments, the interfaces 411 and 415 may support the connection with an external device (for example, the power supply device). For example, the interface 411 or 415 may include a universal serial bus (USB) interface, and the electronic device 400 may be connected to an external device (for example, the power supply device 401) through a USB port to receive various pieces of data (for example, software binary). When the power supply device 401 and the electronic device 400 are electrically connected through the interface 411 or 415, the device ID of the power supply device 401 and data related thereto may be transmitted to the electronic device 400.

According to various embodiments, the electronic device 400 may receive and read the ID of the power supply device. The processor or an ID sensing unit (not shown) may read information related to the type, functions, specifications, a coupling direction, and the existence/nonexistence of a power supply source corresponding to information included in the device ID. The second processor 425 may execute software suitable for the functions of the connected power supply device 401 and control some functions of the electronic device 400 on the basis of the detected information on the power supply device 401. A process of identifying the device ID through the configuration channel (CC) is described in greater detail below with reference to FIG. 5.

According to various embodiments, when the power supply device 401 and the electronic device 400 are electrically connected, the power supply device 401 may determine whether the electronic device 400 includes a power supply source. When the electronic device 400 includes a power supply source, the first processor 421 of the power supply device 401 may check power of the battery (power supply source) of the electronic device 400.

According to various embodiments, the charging adaptor 431 may include various circuitry and receive power from the battery 433 of the vehicle 403 and transform the power to supply the same to the electronic device 400. Power supplied from the battery 433 of the vehicle 403 may have a value of about 12 V or 18 V. The charging adaptor 431 may transform the voltage to about 5 V and supply the voltage to the electronic device 400 through the power supply switch 451.

Figure 4B:
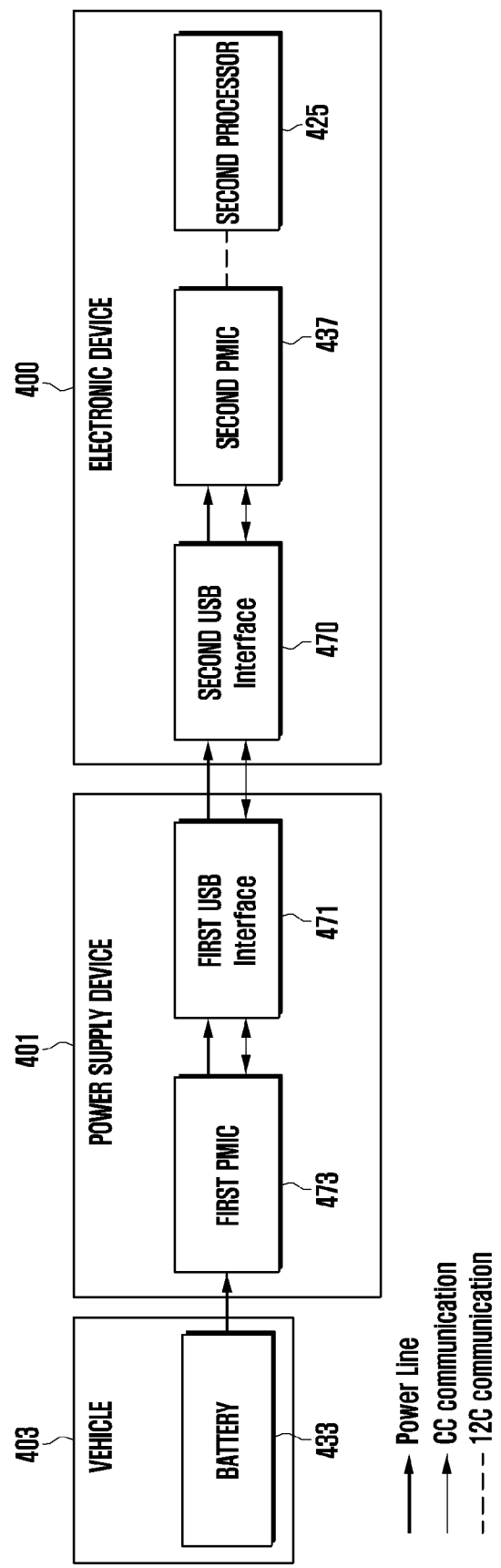
FIG. 4B is a diagram illustrating an example flow of power and data between the power supply device and the electronic device according to various embodiments.

FIG. 4B is a diagram illustrating example flow of power and data between a power supply device and an electronic device according to various embodiments. According to various embodiments, the electronic device 400 may include the second processor (e.g., including processing circuitry) 425, the second PMIC 435, and a second USB interface 470. The power supply device 401 may include a first USB interface 471 and a first PMIC 473

According to various embodiments, the USB interface 470 may include a connection terminal (for example, a USB port) through which power can be supplied from the outside. The PMIC 435 may receive power from an external power source (for example, an external battery or an adaptor) connected through the USB interface 470 and supply power to the electronic device 400.

According to various embodiments, the PMIC 435 may identify whether the battery is mounted to the electronic device 400 on the basis of sensed information. When the battery of the electronic device 400 is mounted or removed, the PMIC 435 may generate an event (for example, direct power mode or uevent (generated when a value of battery-_present is changed)) and transmit the event to the second processor 425. The second processor 425 may read a value of a specific parameter and determine whether the battery (for example, the battery 189 of FIG. 1) is mounted and removed as necessary.

According to various embodiments, when the electronic device 400 is connected to the power supply device 401, the electronic device 400 may transmit a discover identify command to the power supply device 401 through CC communication. That is, the second processor 425 of the electronic device 400 may transmit the discover identity command to the first USB interface 471 of the power supply device 401 through the second USB interface 470. The CC communication and the role of the second USB interface 470 are described in detail with reference to FIG. 5. The electronic device 400 may make a request for unique identification information of the power supply device 401 through the discover identity command. The unique identification information may include a vender ID and a product ID. The power supply device 401 may transmit unique identification information including the vender ID and the product ID to the electronic device 400. The electronic device 400 may detect the type of the power supply device 401 through the unique identification information received from the power supply device 401.

According to various embodiments, the electronic device 400 may detect that the connected external device is the power supply device 401 on the basis of the unique identification information. The hard reset signal may be transmitted from the electronic device 400 to the power supply device 401 through CC communication. When the hard reset signal is transmitted to the power supply device 401, the power supply device 401 may be controlled to be turned off and then turned on. A power on source may be generated in the electronic device 400 while the power supply device 401 is turned off and then turned on. The description that the second PMIC 435 of the electronic device 400 may detect the power on source and turn on the electronic device 400 has been made above with reference to FIG. 3. As a result, when the electronic device 400 is turned off and the hard reset signal is transmitted, the electronic device 400 may be turned on again through such a process.

According to various embodiments, when the power supply device 401 is connected to the electronic device 400, the second processor 425 may perform control to not transmit the hard reset signal when the electronic device 400 is turned off. When the hard reset signal is controlled, the power supply device 401 may maintain the on state when the electronic device 400 is turned off. When the power supply device 401 maintains the on state, travel adapter (TA) interrupt may not be generated in the electronic device 400. The travel adapter (TA) interrupt may generate a power on source related to power of the PMIC. In other words, the travel adapter (TA) interrupt may be generated by the power supply device 401 and transferred to the electronic device 400 through the first USB interface 471. When the travel adapter (TA) interrupt is not transferred to the electronic device 400, the power on source may not be generated in the second PMIC 435. When the power on source is not generated in the second PMIC 435, the electronic device 400 may continuously maintain the off state.

Figure 5:
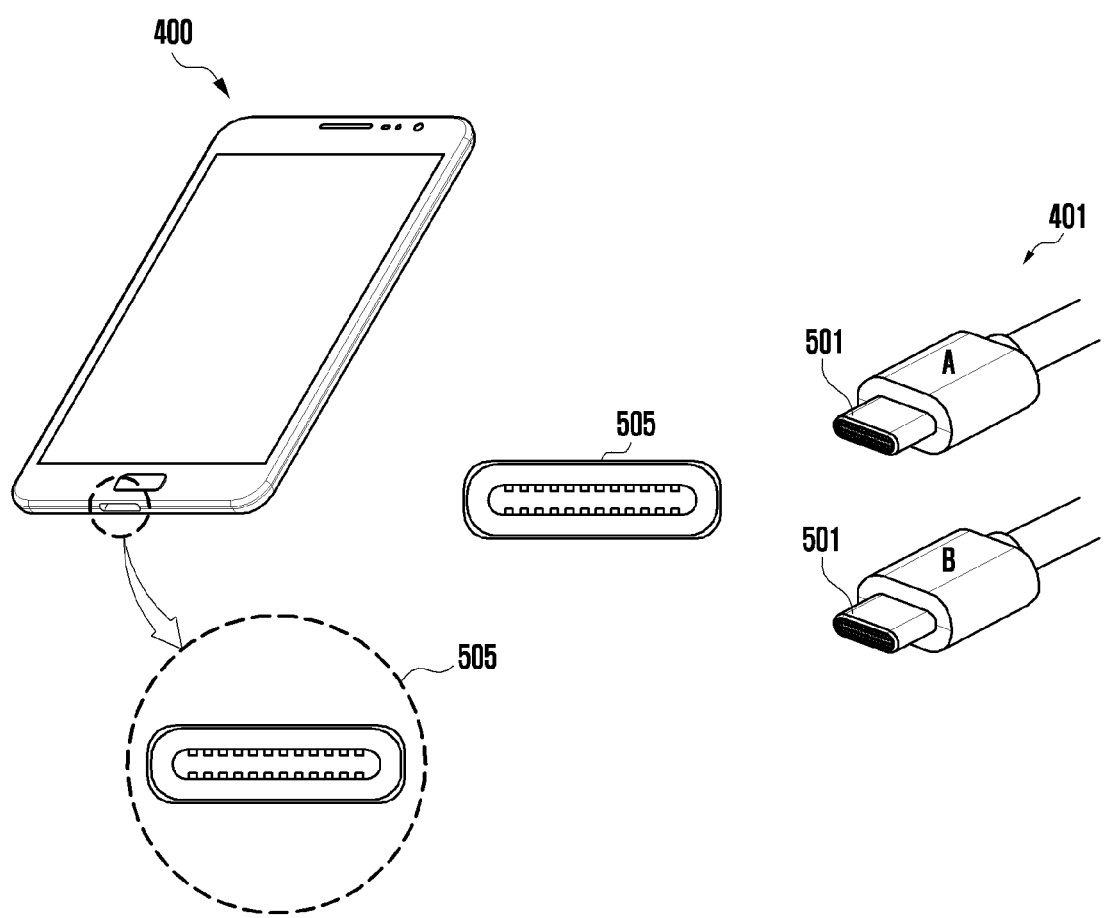
FIG. 5 is a diagram illustrating an example of a connector and a hole of the electronic device and the power supply device according to various embodiments.

FIG. 5 is a diagram illustrating an example structure of a connector and a hole of an electronic device and a power supply device according to various embodiments.

According to various embodiment, a connector 501 of the power supply device 401 may be inserted into a hole of the electronic device 400. The connector 501 of the power supply device 401 may be received through the hole 505 of the electronic device 400 and brought into physical contact with the electronic device 400. According to the physical contact, the electronic device 400 and the power supply device 401 may be electrically connected. The connector 501 according to an embodiment may correspond to the structure into which a USB type-C connector can be inserted.

According to various embodiments, the structure of the connector 501 of the power supply device 401 and the hole of the electronic device 400 may be a reversible structure. The hole 505 of the electronic device 400 may have a first direction perpendicular to a direction into which the power supply device 401 is inserted (for example, from the bottom to the top of the electronic device 400) and a second direction opposite to the first direction, and the directions are symmetrical to each other. For example, the connector 501 may be inserted into the hole 505 of the electronic device 400 in a direction in which one surface (for example, surface A) of the connector 501 of the power supply device 401 is parallel to the front surface of the electronic device 400 (for example, the surface on which the display is located). In another example, the connector 501 may be inserted in a direction in which the other surface (for example, surface B) of the connector 501 of the power supply device 401 is parallel to the front surface of the electronic device 400.

According to various embodiments, configuration channel 1 (CC1) and configuration channel 2 (CC2) terminals included in the USB type-C standard may be used as parts for detecting insertion/removal of the connector and identifying a connector connection mode. For example, when the electronic device 401 and the power supply device 401 are connected through the connector 501, an electrical signal (for example, a digital ID or a resistance ID) may be exchanged through the CC1 and CC2 terminals and accordingly insertion and removal between the electronic device 400 and the power supply device 401 may be detected. The electronic device 400 may perform control to operate the connector connection mode as a downstream facing port (DFP) mode (for example, a mode in which data is provided), an upstream facing port (UFP) mode (for example, a mode in which data is received), and/or a sink mode (for example, a mode in which supply of power is received) on the basis of a value detected by at least one of the CC1 and CC2 terminals.

According to various embodiments, the power supply device 401 may be electrically connected to the electronic device 400 through various input/output interfaces (for example, a peripheral component interconnect express (PCIe) interface, a Lightning interface, or a USB interface).

In the following embodiment, it is assumed and described that the connector 501 of the power supply device 401 is connected to the electronic device 400 through the USB interface 470 (for example, C type). The connector 501 of the power supply device 401 may be implemented in the form of USB type-C. However, the form of the connector 501 is not limited thereto.

According to various embodiments, the power supply device 401 may be electrically connected to the electronic device 400 through the connector 501. For example, the connector 501 of the power supply device 401 may be received through the hole 505 of the electronic device 400 and come into physical contact with the electronic device 401. Further, the power supply device 401 and the electronic device 400 may be electrically connected.

According to various embodiments, the first processor 421 of the power supply device 401 may detect the connection between the electronic device 400 and the connector 501. The first processor 421 of the power supply device 401 may identify a type of a signal detected by a CC pin according to the connection of the electronic device 400 to the connector 501 and identify information on the electronic device 400 on the basis of the type of the signal (for example, a V/P ID). The first processor 421 of the power supply device 401 may supply power to the PMIC 435 of the electronic device 400 through the power supply switch 451.

According to various embodiments, when the electronic device 400 is connected to the connector 501, the second processor 425 of the electronic device 400 may acquire information on the power supply device 401 for data transmission between the power supply device 401 and the electronic device 400 The information on the power supply device 401 may include a vendor identification (VID) indicating information on a manufacturer of the power supply device 401, a product identification (PID) indicating a product, the number of interfaces supported by the power supply device 401, a sample rate, channel information, and/or a device descriptor including a bit rate.

In an embodiment, the first processor 421 may transfer some of the information on the power supply device 401, for example, VID and PID information which can be acquired in response to insertion of the connector 501 into the electronic device 400 to the second interface 415 through the first interface 411.

In an embodiment, the first interface 411 may identify whether the second interface 415 for recognizing the connection of the electronic device 400 through access at a predetermined time interval is activated. The first processor 421 may transmit a V/P ID and a power on/off V/P signal to the electronic device 400 on the basis of activation of the second interface 415 for recognizing the connection of the electronic device 400.

According to various embodiments, the first processor 421 of the power supply device 401 may detect whether the electronic device 400 is connected through the first interface 411. According to various embodiments, the second processor 425 of the electronic device 400 may make a request for identification information of the connected power supply device 401. The power supply device 401 may transmit its own identification information to the electronic device 400 in response to the request for the identification information. The identification information may include, for example, at least one of a product ID of the power supply device 401 and manufacturer information. The processor or an ID sensing unit (not shown) may recognize the identification information transmitted by the power supply device 401.

According to various embodiments, the second processor 425 may determine whether the recognized identification information matches pre-stored identification information of a specific power supply device 401. When the recognized identification information matches the stored identification information of the specific power supply device 401 on the basis of the determination result, the second processor 425 may control the second interface 415 and the PMIC 435 to receive power from the power supply device 401.

According to various embodiments, the electronic device 400 may include a portable electronic device such as a smartphone or a tablet PC including a removable internal battery. Further, the electronic device 400 may include a navigation for vehicle or a record measurement device for vehicle having no internal battery. The electronic device 400 may include the hole 505 to which the power supply device 401 (for example, an always-on accessory device) can be connected. According to an embodiment, the electronic device 400 may be connected to the accessory device through the connector 501 and transmit and receive data (for example, multimedia data such as audio data or other control commands) to and from the connected accessory device. The connector 501 of the accessory device may be inserted into the hole 505 of the electronic device 400. There is no limitation on the type of the accessory device which can be connected to the hole 505 of the electronic device 400, but the case in which the connected accessory device is the power supply device 401 for power supply is described as an example hereinafter.

According to various embodiments, the connector 501 may be a connector according to the universal serial bus (USB) standard and, more specifically, be a connector of the USB type-C standard. The second USB interface 470 may transmit data (for example, data transmitted by a configuration channel 1 (CC1) pin or a configuration channel 2 (CC2) pin) which can be used for automatically detecting which devices are connected between a source (a device providing power) and a sink (a device receiving power) or between a downstream facing port (DFP) (a device providing data) and an upstream facing port (UFP) (a device receiving data). When the electronic device 400 and the power supply device 401 are connected, an electrical signal (for example, a digital ID or a resistance ID) may be exchanged through CC1 and CC2 terminals and accordingly, the electronic device 400 may detect a type of another connected device (for example, the power supply device).

According to various example embodiments, an electronic device (for example, the electronic device 400 of FIG. 4) may include a USB interface (for example, the second interface 415 of FIG. 4) configured to perform configuration channel (CC) communication with an external device (for example, the power supply device 401 of FIG. 4), a power management IC (PMIC) (for example, the second PMIC 435 of FIG. 4) configured to control power of the electronic device, and a processor (for example, the second processor 425 of FIG. 4) operatively connected to the USB interface and the PMIC, and the processor may be configured to: based on the external device being connected through the USB interface, perform control to transmit a first command making a request for unique identification information to the external device through the USB interface, recognize the external device as a power supply device supplying power to the electronic device, based on the unique identification information received from the external device, based on the electronic device having a battery and the electronic device being turned off, transmit a second command indicating rebooting of the external device through the USB interface, and based on the electronic device not having a battery and the electronic device being turned off, not transmitting the second command to the external device.

According to various example embodiments, the first command may include a discovery identity command making a request for unique identification information of the external device, wherein the interface is configured to transfer the discovery identity command to the external device through configuration channel (CC) communication.

According to various example embodiments, the unique identification information may include a vender ID/product ID (VID/PID) of the external device.

According to various example embodiments, the processor may be configured to receive the unique identification information of the external device through the interface.

According to various example embodiments, the processor may be configured to detect a type of the external device according to the received unique identification information.

According to various example embodiments, the second command may include a hard reset signal configured to turn off and then turn on the external device based on the electronic device being turned off, wherein the interface is configured to transfer the hard reset signal to the external device through configuration channel (CC) communication.

According to various example embodiments, based on the electronic device not having a battery, the processor may be configured to not transmit the hard reset signal to the external device based on the electronic device being turned off.

According to various example embodiments, the interface may be configured to transfer a first interrupt to the PMIC based on the external device being turned on, the first interrupt may include travel adapter (TA) interrupt generating a power on source, the power on source may be configured to be generated as the external device is turned off and turned on, and the PMIC may be configured to perform control to turn on the electronic device based on the power on source being detected.

According to various example embodiments, based on the electronic device having a battery, the processor may be configured to perform control to not turn on the electronic device even though the PMIC detects the power on source.

According to various example embodiments, the processor is configured to, based on an external device being connected through the USB interface, perform control to transmit a first command making a request for unique identification information to the external device through the USB interface, recognize the external device as a power supply device supplying power to the electronic device, based on the unique identification information received from the external device and perform control to receive power from the power supply device, determine whether the electronic device has a battery and/or whether the battery is removed, and not transmit a second command to the external device based on the electronic device being turned off and the electronic device not having a battery or the battery being removed.

Figure 6:
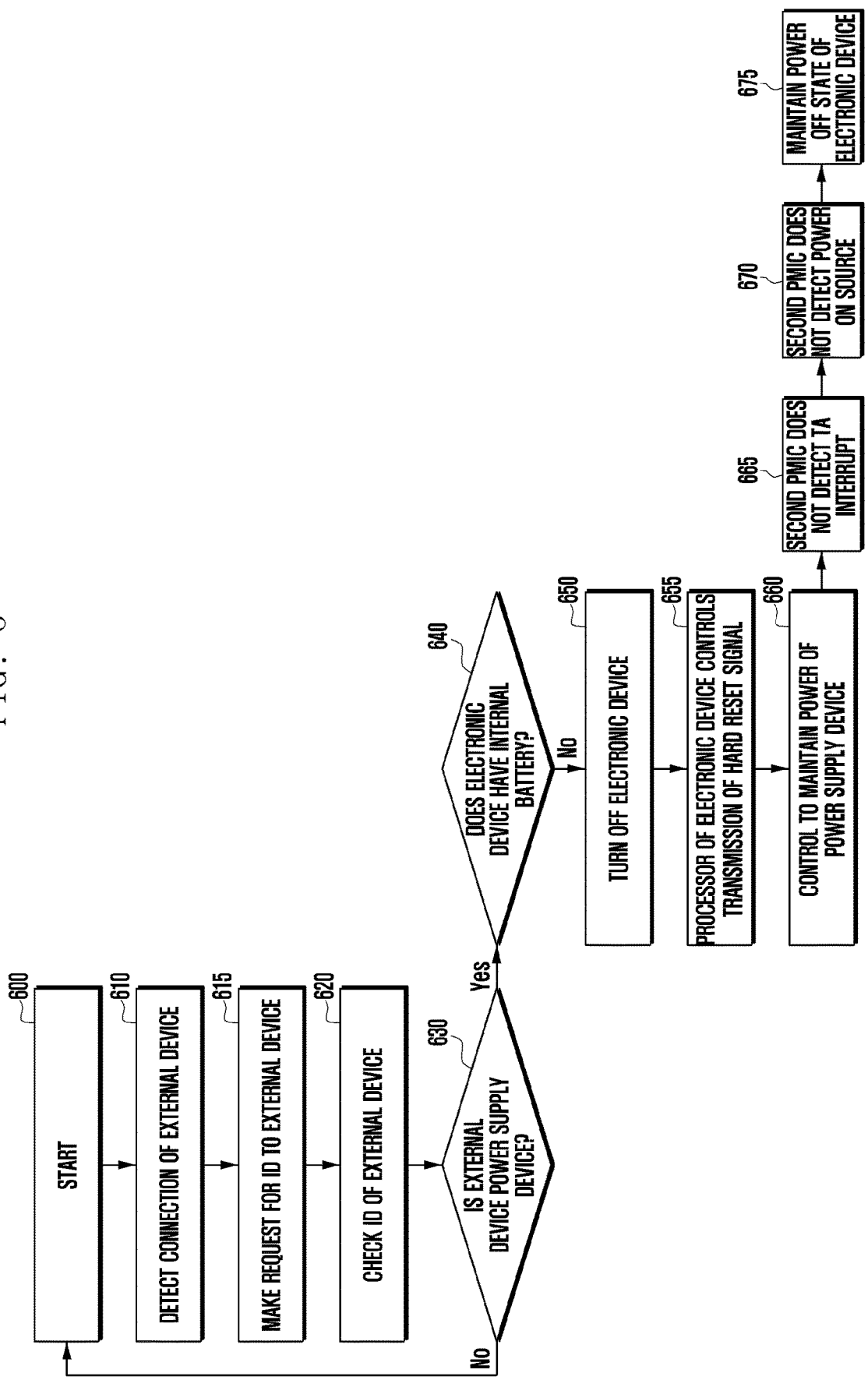
FIG. 6 is a flowchart illustrating an example power control method of the electronic device according to various embodiments.

FIG. 6 is a flowchart illustrating an example power control method of an electronic device according to various embodiments.

The illustrated method 600 can be performed by the electronic device (for example, the electronic device 400 of FIG. 4) described with reference to FIGS. 1 to 5, and the technical features may not be repeated below.

The power control method of the electronic device 400 according to various embodiments may include an operation of detecting the connection with an external device (for example, the power supply device 401 of FIG. 4) and an operation of making a request for unique identification information to the external device. The unique identification information may include a vender ID/product ID (V/P ID) of the external device. An operation of making a request for unique identification information to the external device may include an operation of transmitting a first command to the external device. The first command may include a discovery identity command making a request for unique identification information of an external device. The discovery identity command may be transferred to the external device from the interface through configuration channel (CC) communication.

The power control method of the electronic device 400 may include an operation of, when the electronic device 400 includes a battery, transmitting a second command to the external device when the electronic device 400 is turned off. When the electronic device 400 does not have a battery, the power control method of the electronic device 400 may include an operation of not transmitting the second command to the external device when the electronic device is turned off. The second command may include a hard reset signal for turning off the power supply device and then turning on the power supply device again when the electronic device 400 is turned off. The hard reset signal may be transferred from the interface to the external device through configuration channel (CC) communication.

The electronic device 400 may detect the connection of the external device in operation 610 and transmit a discover identity command making a request for unique identification information of the external device in operation 615. The unique identification information may include a vender ID/product ID (V/P ID) of the external device. The external device may transmit V/P ID information to the electronic device 400 in response to the request for the unique identification information. In operation 620, the second processor 425 of the electronic device 400 may identify V/P ID information transmitted from the external device. The second processor 425 may identify the type of the external device through the V/P ID information. The process of detecting the connection of the external device and identifying the V/P ID has been described in detail above with reference to FIG. 5.

In operation 630, the second processor 425 may detect whether the external device is the power supply device 401 through the V/P ID information. When the external device corresponds to the power supply device 401, the operation of the electronic device 400 may vary depending on whether the electronic device 400 has an internal battery in operation 640.

FIG. 6 assumes and describes that the electronic device 400 does not have an internal battery (for example, the battery is removed or never exists). In operation 650, the second processor 425 of the electronic device 400 may perform control to turn off power of the electronic device 400. The generation of the hard reset signal during the power off process of the electronic device 400 has been described above with reference to FIG. 3.

In operation 655, the second processor 425 may perform control to not transmit the hard reset signal. In operation 660, the power supply device 401 which has not received the hard reset signal may maintain the power on state even though the electronic device 400 is turned off. When the power supply device 401 is maintained in the on state, the first USB interface 471 may not transmit TA interrupt to the second USB interface 470 in operation 665. When the TA interrupt is not received, the second PMIC 435 may not generate a power on source.

In this case, in operation 670, the second PMIC 435 may not detect the power on source. The power on source may include signal turning on the electronic device by the PMIC (for example, the second PMIC 435). When the second processor 425 of the electronic device 400 does not detect the power on source, the second PMIC 435 may not turn on the electronic device 400. As a result, the electronic device 400 may maintain the power off state in operation 675. According to an embodiment, the electronic device 400 may transmit the hard reset signal before execution of power on. According to an embodiment, as the electronic device 400 maintains the power off state without rebooting, the electronic device 400 may prevent and/or reduce power consumption and prevent and/or reduce the battery 433 with the vehicle 403 from being discharged. The role of the hard reset signal and the process of turning off the electronic device 400 by controlling the hard reset signal have been described in detail above with reference to FIGS. 4A to 4B.

Figure 7:
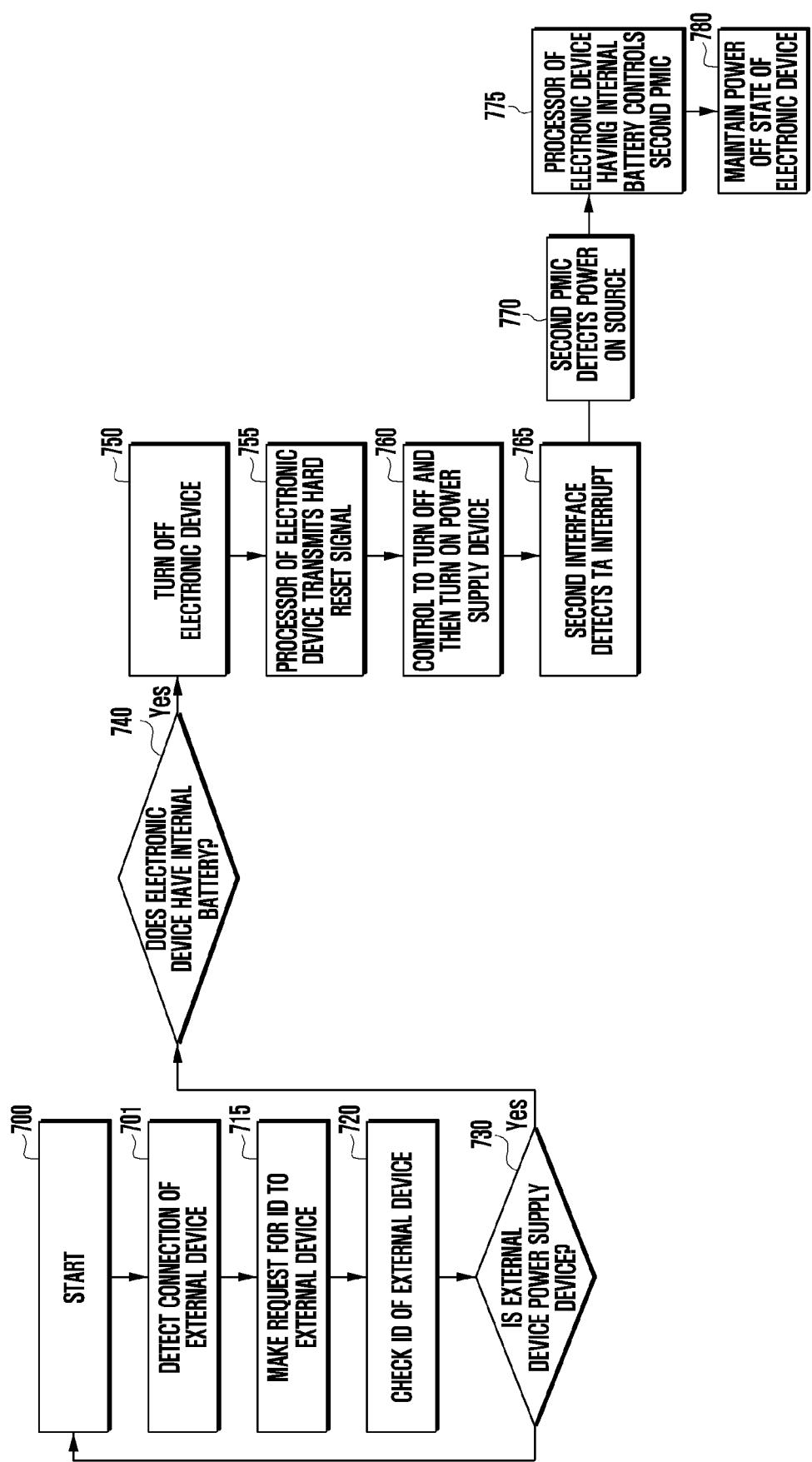
FIG. 7 is a flowchart illustrating an example power control method of the electronic device according to various embodiments.

FIG. 7 is a flowchart illustrating an example method of controlling power by an electronic device according to various embodiments.

The illustrated method 700 can be performed by the electronic device (for example, the electronic device 400 of FIG. 4) described with reference to FIGS. 1 to 5, and the technical features may not be repeated below.

The power control method of the electronic device 400 according to various embodiments may further include an operation of performing control to not turn on the electronic device 400 even though the second PMIC 435 detects the power on source. The power on source may be generated as the external device is turned off and then turned on. When the power on source is detected, the second PMIC 435 may perform control to turn on the electronic device 400.

As described above with reference to FIG. 6, the electronic device 400 may detect the connection of the external device in operation 710 and transmit a discover identity command making a request for unique identification information of the external device in operation 715. The unique identification information may include a vender ID/product ID (V/P ID) of the external device. The external device may transmit V/P ID information to the electronic device 400 in response to the request for the unique identification information. In operation 720, the second processor 425 of the electronic device 400 may identify V/P ID information transmitted from the external device. The second processor 425 may identify the type of the external device through the V/P ID information.

In operation 730, the second processor 425 may detect whether the external device is the power supply device 401 through the V/P ID information. When the external device corresponds to the power supply device 401, the operation of the electronic device 400 may vary depending on whether the electronic device 400 has an internal battery in operation 740.

FIG. 7 assumes and describes that the electronic device 400 has an internal battery unlike FIG. 6. In operation 750, the second processor 425 of the electronic device 400 may perform control to turn off power of the electronic device 400. The generation of the hard reset signal during the power off process of the electronic device 400 has been described above with reference to FIG. 3.

In operation 755, the second processor 425 of the electronic device 400 may transmit the hard reset signal to the power supply device 401. In operation 760, the hard reset signal may turn off the power supply device 401 and then turn on the same. As the power supply device 401 is turned on, the first USB interface 471 may transmit TA interrupt to the second USB interface 470 in operation 765. The second processor 425 may detect TA interrupt through the second USB interface 470 and generate the power on source. In operation 770, the second PMIC 435 may detect the power on source. The power on source may include a signal turning on power of the electronic device 400.

The second processor 425 of the electronic device 400 having the internal battery may perform control to not turn on the electronic device 400 again even through the second PMIC 435 detects the power on source. The electronic device 400 having the internal battery may operate the second processor 425 for a predetermined time (for example, a time to the generation of the power on source in the second PMIC 435 after the hard reset signal of the electronic device is transferred to the power supply device 401) even though the external power supply device 401 blocks power supply. Although the power on source is detected, the second PMIC 435 may perform control to not turn on the electronic device 400 in operation 775. Thereafter, since the hard reset signal is not generated again, the electronic device 400 may continuously maintain the power off state in operation 780. As the electronic device 400 maintains the power off state without rebooting, it is possible to prevent and/or reduce power consumption through the electronic device 400 and prevent and/or reduce discharging of the battery 433 within the vehicle 403 or power consumption through a wall outlet.

According to various example embodiments, a method of controlling power by an electronic device (for example, the electronic device 400 of FIG. 4) may include: detecting a connection of an external device (for example, the power supply device 401 of FIG. 4), making a request for unique identification information to the external device, based on the electronic device having a battery and the electronic device being turned off, transmitting a second command to the external device, and based on the electronic device not having a battery and the electronic device being turned off, not transmitting the second command to the external device.

According to various example embodiments, the making the request for the unique identification information to the external device may include transmitting a first command to the external device, and the first command may include a discover identity command making a request for the unique identification information of the external device.

According to various example embodiments, the discovery identity command may be transferred to the external device from the interface through configuration channel (CC) communication.

According to various example embodiments, the unique identification information may include a vender ID/product ID (VID/PID) of the external device.

According to various example embodiments, the making the request for the unique identification information to the external device may include receiving the unique identification information of the external device through an interface and detecting a type of the external device according to the received unique identification information.

According to various example embodiments, the second command may include a hard reset signal of turning off and turning on the external device based on the electronic device being turned off, and the hard reset signal may be transferred to the external device from the interface through configuration channel (CC) communication.

According to various example embodiments, based on the electronic device having the battery and the electronic device being turned off, transmitting of the second command to the external device may further include performing control to not turn on the electronic device even though a PMIC detects a power on source, the power on source may be generated as the external device is turned off and turned on, and the PMIC may perform control to turn on the electronic device based on the power on source being detected.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a universal serial bus (USB) interface configured to perform configuration channel (CC) communication with an external device;
    a power management IC (PMIC) configured to control power of the electronic device; and
    at least one processor operatively connected to the USB interface and the PMIC,
    wherein the at least one processor is configured, individually or collectively, to, based on the external device being connected through the USB interface, cause the electronic device to:
        transmit a first command making a request for unique identification information, to the external device through the USB interface;
        recognize the external device as a power supply device for supplying power to the electronic device, based on the unique identification information received from the external device;
        based on the electronic device having a battery and the electronic device being turned off, transmit a second command indicating rebooting of the external device through the USB interface; and
        based on the electronic device not having a battery and the electronic device being turned off, not transmit the second command to the external device.

2. The electronic device of claim 1, wherein the first command comprises a discover identity command making a request for unique identification information of the external device, and
    wherein the USB interface is configured to transfer the discover identity command to the external device through the configuration channel (CC) communication.

3. The electronic device of claim 1, wherein the unique identification information comprises a vender ID/product ID (VID/PID) of the external device.

4. The electronic device of claim 1, wherein the at least one processor is configured, individually or collectively, to cause the electronic device to receive the unique identification information of the external device through the USB interface.

5. The electronic device of claim 1, wherein the at least one processor is configured, individually or collectively, to cause the electronic device to detect a type of the external device according to the received unique identification information.

6. The electronic device of claim 1, wherein the second command comprises a hard reset signal configured to turn off and turn on the external device based on the electronic device being turned off, and
    wherein the USB interface is configured to transfer the hard reset signal to the external device through the configuration channel (CC) communication.

7. The electronic device of claim 6, wherein the at least one processor is configured, individually or collectively, to, based on the electronic device not having a battery, cause the electronic device to not transmit the hard reset signal to the external device based on the electronic device being turned off.

8. The electronic device of claim 1, wherein the USB interface is configured to transfer a first interrupt to the PMIC based on the external device being turned on,
    wherein the first interrupt comprises a travel adapter (TA) interrupt generating a power-on source,
    wherein the power-on source is generated as the external device is turned off and turned on, and
    wherein the PMIC is configured to perform control to turn on the electronic device based on the power-on source being detected.

9. The electronic device of claim 8, wherein the at least one processor is configured, individually or collectively, to, based on the electronic device having a battery, cause the electronic device to not turn on the electronic device even though the PMIC detects the power-on source.

10. A method of controlling power by an electronic device, the method comprising:
    detecting a connection of an external device through a USB interface;
    transmitting a first command making a request for unique identification information, to the external device;

recognizing the external device as a power supplying device for supplying power to the electronic device, based on the unique identification information received from the external device;

based on the electronic device having a battery and the electronic device being turned off, transmitting a second command indicating rebooting of the external device through the USB interface; and based on the electronic device not having a battery and the electronic device being turned off, not transmitting the second command to the external device.

11. The method of claim 10, wherein the first command comprises a discover identity command making a request for the unique identification information of the external device.

12. The method of claim 11, wherein the discover identity command is transferred to the external device from the USB interface through configuration channel (CC) communication.

13. The method of claim 11, wherein the unique identification information comprises a vender ID/product ID (VID/PID) of the external device.

14. The method of claim 11, further comprising:

receiving the unique identification information of the external device through the USB interface; and detecting a type of the external device according to the received unique identification information.

15. The method of claim 10, wherein the second command comprises a hard reset signal for turning off and turning on the external device based on the electronic device being turned off, and wherein the hard reset signal is transferred to the external device from the USB interface through configuration channel (CC) communication.

16. The method of claim 15, further comprising not turning on the electronic device even though a PMIC detects a power-on source, wherein the power-on source is generated as the external device is turned off and then turned on, and wherein the PMIC is configured to turn on the electronic device based on the power-on source being detected.

17. An electronic device comprising:

a universal serial bus (USB) interface;

a power management IC (PMIC) configured to control power of the electronic device; and at least one processor operatively connected to the USB interface and the PMIC, wherein the at least one processor is configured, individually or collectively, to, based on an external device being connected through the USB interface, cause the electronic device to:

transmit a first command making a request for unique identification information to the external device through the USB interface;

recognize the external device as a power supply device for supplying power to the electronic device, based on the unique identification information received from the external device;

receive power from the power supply device;

determine whether the electronic device has a battery and/or whether the battery is removed;

based on the electronic device being determined to have a battery and the electronic device being turned off, transmit a second command indicating rebooting of the external device through the USB interface; and based on the electronic device being turned off and the electronic device being determined to not have a battery or having battery removed, not transmit the second command to the external device.

* * * * *